United States Patent
Huntwork et al.

(10) Patent No.: US 10,909,557 B2
(45) Date of Patent: Feb. 2, 2021

(54) PREDICTING AND CLASSIFYING NETWORK ACTIVITY EVENTS

(71) Applicant: Amazon Technologies, Inc., Seattle, WA (US)

(72) Inventors: Andrew Stuart Huntwork, Seattle, WA (US); Melissa Elaine Davis, Edmonds, WA (US); Gavin Richard Jewell, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 431 days.

(21) Appl. No.: 15/651,057

(22) Filed: Jul. 17, 2017

(65) Prior Publication Data

US 2017/0316437 A1    Nov. 2, 2017

Related U.S. Application Data

(63) Continuation of application No. 13/924,046, filed on Jun. 21, 2013, now Pat. No. 9,727,882.

(51) Int. Cl.
*G06Q 30/02* (2012.01)
*G06F 9/50* (2006.01)

(52) U.S. Cl.
CPC .......... *G06Q 30/0202* (2013.01); *G06F 9/50* (2013.01)

(58) Field of Classification Search
None
See application file for complete search history.

(56) References Cited

U.S. PATENT DOCUMENTS

| | | | |
|---|---|---|---|
| 7,904,544 B2 | 3/2011 | Migita et al. | |
| 8,042,171 B1 | 10/2011 | Nordstrom | |
| 8,392,991 B2* | 3/2013 | Ansari | H04L 63/1416 709/223 |
| 9,015,068 B1* | 4/2015 | Bertz | G06Q 30/0633 705/26.8 |
| 2005/0207413 A1* | 9/2005 | Lerner | G06F 21/552 370/389 |
| 2009/0043593 A1* | 2/2009 | Herbrich | G06Q 10/04 705/318 |
| 2009/0089699 A1 | 4/2009 | Saha et al. | |
| 2011/0093413 A1* | 4/2011 | Calcaterra | G06F 11/3409 706/11 |
| 2011/0119226 A1 | 5/2011 | Ruhl | |
| 2012/0054019 A1 | 3/2012 | Kitts et al. | |

(Continued)

OTHER PUBLICATIONS

Botz4Sale: Surviving Organized DDoS Attacks That Mimic Flash Crowds; Srikanth Kandula et. al.; 2005 2nd Symposium on Networked Systems Design & Implementation (Year: 2005).*

(Continued)

*Primary Examiner* — Deirdre D Hatcher
(74) *Attorney, Agent, or Firm* — Thomas | Horstemeyer, LLP (57) ABSTRACT

Disclosed are various embodiments for predicting and classifying events that create a sudden or substantial increase in network traffic activity. To begin, an increase of network activity can be detected. Upon detecting the increase in network activity, it can be determined that the increase in network activity is unexpected in view of one or more predicted activity events. The system can be adjusted to reduce the network activity in response to determining that the increase in network activity is unexpected.

20 Claims, 7 Drawing Sheets

(56) References Cited

U.S. PATENT DOCUMENTS

2012/0144038 A1* 6/2012 Hildebrand ......... H04L 41/0806
709/226
2013/0218825 A1 8/2013 Zhang
2014/0025535 A1 1/2014 Douglas

OTHER PUBLICATIONS

Distinguishing DDoS Attacks from Flash Crowds Using Probability Metrics; Ke Li et. al,; 2009 Third International Conference on Network and System Security (Year: 2009).*
Flash Sales and Scalable eCommerce: An Amazon White Paper: Dec. 2011 (Year: 2011).*
Flash Sales and Scalable eCommerce: An Amazon White Paper; Dec. 2011.

* cited by examiner

PREDICTING AND CLASSIFYING NETWORK ACTIVITY EVENTS

CROSS-REFERENCE TO RELATED APPLICATIONS

This application is a continuation of co-pending U.S. utility application entitled, "Predicting and Classifying Network Activity Events," having Ser. No. 13/924,046, filed Jun. 21, 2013, which is entirely incorporated herein by reference.

BACKGROUND

An electronic marketplace may include listings of items offered for sale by many different merchants. Customers may use the electronic marketplace to purchase items of interest. In some instances, there may be a sudden and substantial increase in network traffic which may impede the network capacity of the electronic marketplace or portion of the electronic marketplace. As such, intended customers may experience difficulties in accessing the electronic marketplace during the sudden and substantial increase in traffic activity.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to predicting a future occurrence of a sales event and determining whether a detected sudden and substantial increase in network traffic activity relates to the predicted sales event. A sales event may, for example, relate to an increased interest in and/or purchase of an item or items offered for sale in an electronic marketplace resulting in a sudden and substantial increase in traffic activity. The items related to the sales event may include for example, products, goods, services, digital downloads, gift cards, and/or other items that may be purchased in an electronic marketplace. The sudden and substantial increase in traffic activity may exceed the network capacity capabilities of the system supporting the electronic marketplace or portion(s) of the electronic marketplace.

A flash sale, for example, may be considered a type of sales event. A flash sale relates to an event in which multiple users are accessing the same network content at the same time to view product information and/or purchase a product(s) or services accessible via the network content. As such, a flash sale may occur at the same time as the start of a promotion, a message is set denoting a design change, when inventory becomes viable, an inventory change, a change in price, and/or other event that may increase item interest for customers. For example, a flash sale may occur due to the offering of a popular item at a discounted price for a limited time. As such, a large number of customers, at the same time, may try to access certain content within the electronic marketplace to purchase the discounted popular item during the limited time, especially at the start of the sale. In contrast, other types of alternative activity events may include a network attack event which may related to a denial of service attack. A denial of service attack, for example, may relate to targeting a computing environment with the purpose of hindering the network capacities such that the intended users are not able to access certain content within the electronic marketplace.

In one embodiment, multiple event prediction factors may be searched for in determining whether a future occurrence of a sales event will occur during a predefined period of time. For example, the event prediction factors searched for may include the start time of a promotion; the time related to the release of messages including a product advertisement; the time related to when inventory becomes buyable; the time that an item price decreases; whether a combination of at least a subset of the event prediction factors occurs at the same time, a pattern of event prediction factors relating to prior sales events, a social media interest, and/or other factors which may affect the interests of users with respect to items offered for sale in the electronic marketplace.

In another embodiment, when a sudden and substantial increase in network traffic activity is detected, multiple factors may be considered to classify whether the detected activity event is due to a sales event or some other type of event. Classification factors that may be considered may include: whether a sales event was previously predicted to occur at the time of the sudden increase in network traffic activity; whether the network traffic from known sale referrers spike; whether a spike in purchase orders occurs at the same time as the sudden increase in network traffic activity; whether characteristics surrounding the current sudden increase in network traffic activity are similar to known characteristics from either prior known sales events or other prior known types of events; and/or other factors that may be used to characterize the cause of the sudden increase in network traffic activity.

In the following discussion, a general description of the system and its components is provided, followed by a discussion of the operation of the same.

Figure 1A:
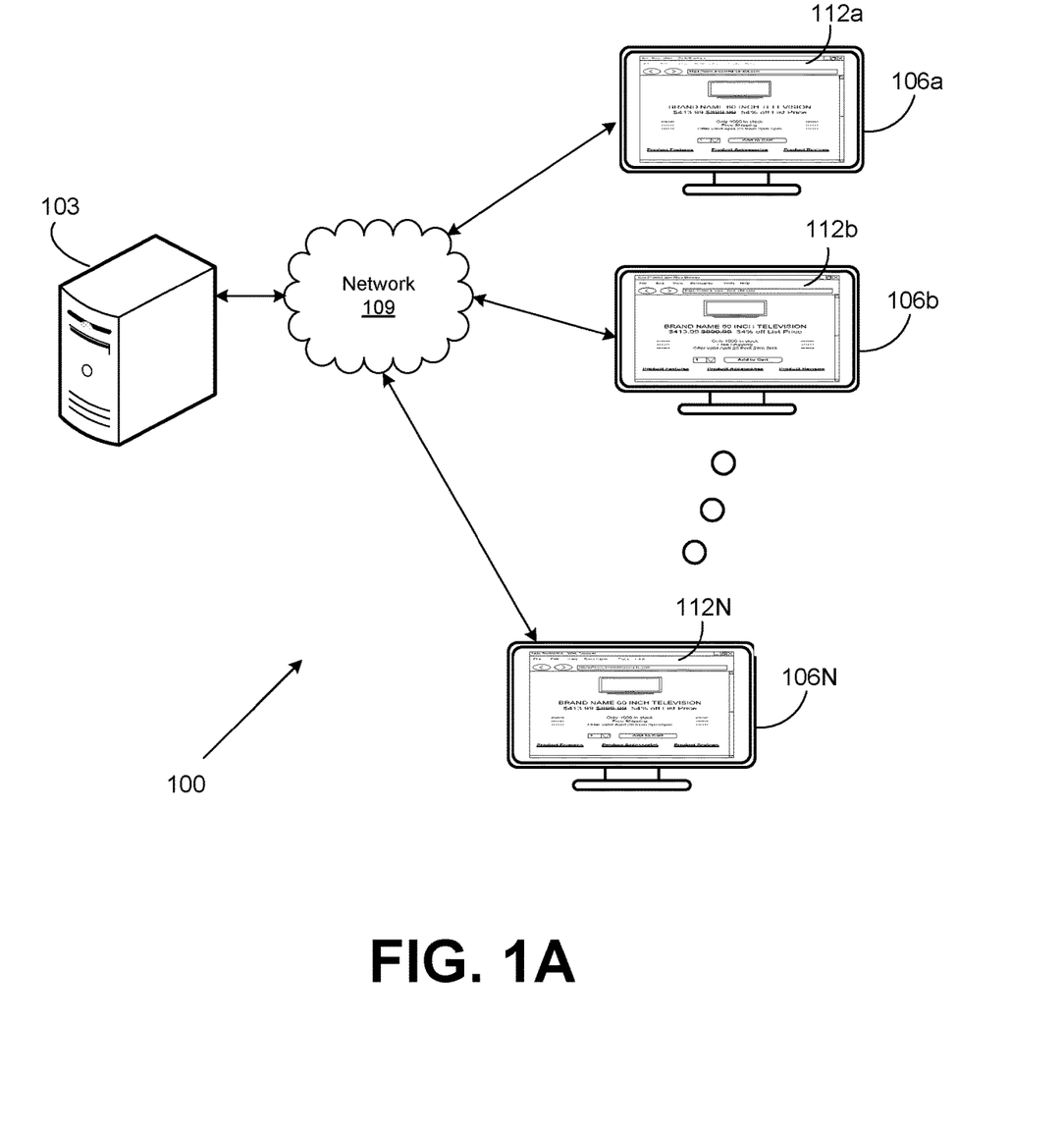
FIG. 1A is a drawing presenting one example of operation of a networked environment according to various embodiments of the present disclosure.

With reference to FIG. 1A, shown is one example of operation for a networked environment 100 according to various embodiments. The networked environment 100 includes a computing environment 103 in data communication with multiple clients 106a, 106b, . . . 106N which are in data communication via a network 109. As shown, each of the clients 106a, 106b, . . . 106N are each viewing the same user interface 112a, 112b, . . . 112N. FIG. 1A may be an example of a sales event. The more clients 106a, 106b, . . . 106N accessing the same network content, the more likely the network capacity requirements would need to be adjusted to support the increase in traffic.

Figure 1B:
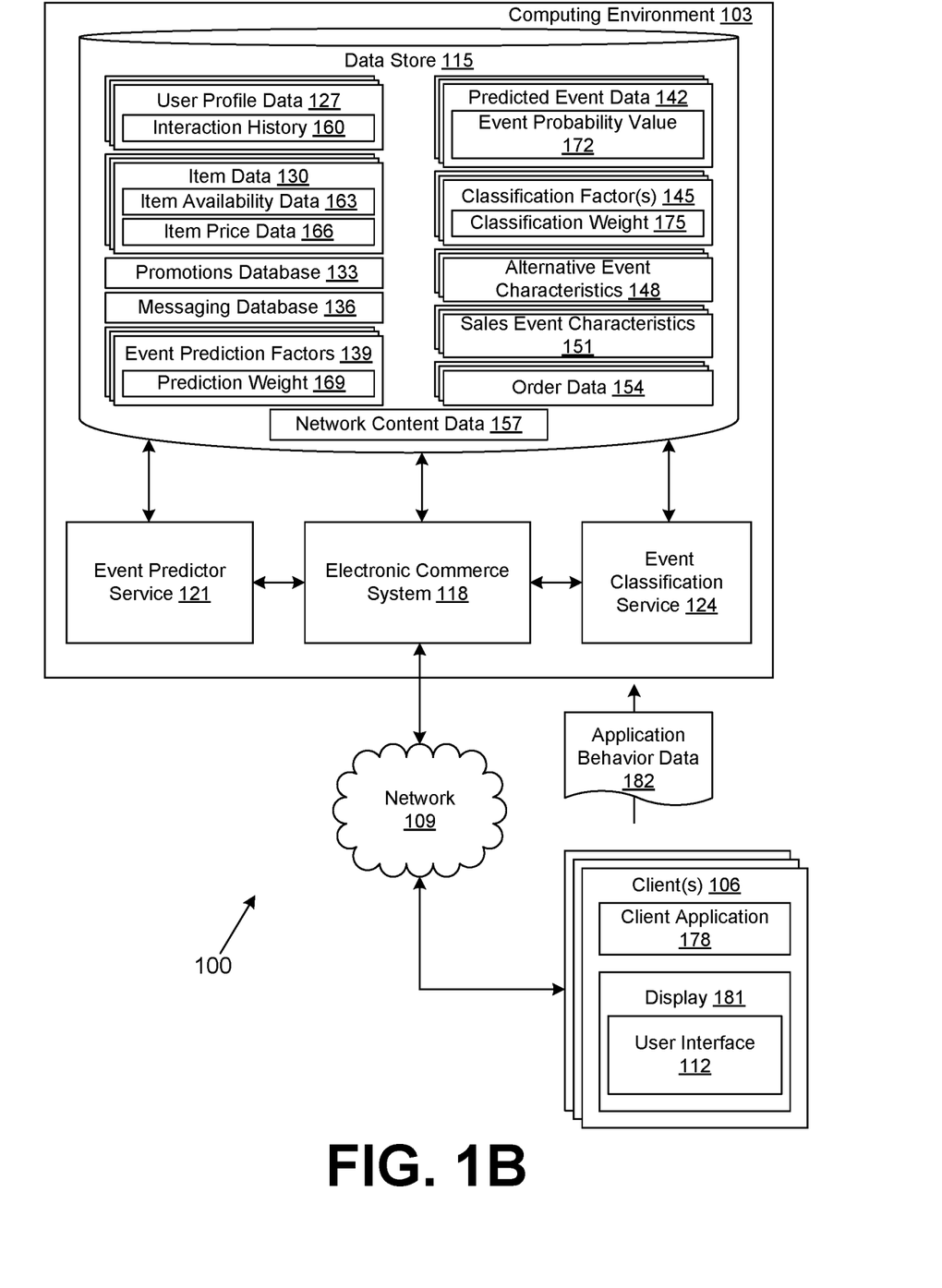
FIG. 1B is a drawing presenting a detailed view of the networked environment of FIG. 1B according to various embodiments of the present disclosure.

With reference to FIG. 1B, shown is a networked environment 100 according to various embodiments. The networked environment 100 includes a computing environment 103 and a plurality of clients 106, which are in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include an electronic commerce system 118, an event predictor service 121, an event classification service 124, and other applications, services, processes, systems, engines, or functionality not discussed in detail herein. The electronic commerce system 118 is executed to facilitate the merchandising and purchase, rental, lease, download, and/or other form of consumption of items over the network 109. The items may include for example, products, goods, services, digital downloads, gift cards, and/or other items that may be purchased in an electronic marketplace. The electronic marketplace may include listings of items offered for sale by many different merchants. The electronic marketplace may be operated by a proprietor who may also be a merchant.

The electronic commerce system 118 also performs various backend functions associated with the online presence of a merchant in order to facilitate the online purchase of items. For example, the electronic commerce system 118 may generate network content such as web pages, mobile application data, or other forms of content that are provided to clients 106 for the purpose of selecting items for purchase, rental, download, lease, or other forms of consumption.

The event predictor service 121 is executed to predict a future occurrence of a sales event during a predefined period of time. The event predictor service 121 may scan various databases to identify event prediction factors that may occur during the predefined period of time. In addition, the event predictor service 121 may calculate a probability value that may be used in determining the likelihood of a sales event occurring during the predefined period of time.

The event classification service 124 is executed to detect and classify a sudden and substantial increase in traffic activity with respect to an electronic marketplace. The event classification service 124 may be executed to evaluate at least one classification factor to determine whether the detection of the increase in traffic activity is related to a sales event or other type of alternative activity event, such as, for example, a network attack event. Additionally, the event classification service 124 may adjust and/or recommend adjusting the network requirements of the system supporting the electronic marketplace based at least in part on the classification of the activity event causing the increase in network traffic activity.

The data stored in the data store 115 includes, for example, user profile data 127, item data 130, promotions database 133, messaging database 136, event prediction factors 139, predicted event data 142, classification factor(s) 145, alternative event characteristics 148, sales event characteristics 151, order data 154, network content data 157, and potentially other data. The user profile data 127 may include various information collected from or generated regarding users. The user profile data 127 may include interaction history 160 and/or other information. The interaction history 160 may include information specific to the user such as, for example, a purchase history, a browsing history, a viewing history, and/or other information that reflects a prior interaction of the user with the computing environment 103. The item data 130 relates to information pertaining to an item or items offered for sale, lease, download and/or other form of consumption. The item data 130 may include item availability data 163, item price data 166 and/or other information. The item availability data 163 may include information related to when the respective item is available for purchase and/or other information related to the availability to the item. The item price data 166 may include pricing information, discount information, and/or other information related to the price of an item.

The promotions database 133 may include promotional information relating to items offered for sale, lease, download and/or other form of consumption with respect to the electronic marketplace. For example, the promotions database 133 may include information regarding an upcoming sale with respect to a particular item and/or items that may be associated with a merchant and/or multiple merchants. The messaging database 136 may include information relating to messages that have been and/or will be sent relating to items within the electronic marketplace. For example, the messages may relate to a design change in an item, a release date of an item, and/or other information that may increase a user's interest in an item.

The event prediction factors 139 include one or more factors that the identification of is probative in predicting the future occurrence of a sales event during a predefined period of time. The event prediction factors 139 may include a prediction weight 169 and/or other information. The prediction weight 169 relates to a value to be assigned and/or incremented when a search for an event prediction factor 139 produces a positive result (i.e. identification).

The predicted event data 142 includes information relating to predictions relating to future sales events. The predicted event data 142 may include an event probability value 172, a time of the predicted event, and/or other information related to a possible sales event. The event probability value 172 relates to a value that is used to determine the likelihood of a sales event.

The classification factors 145 include one or more factors that may be considered when classifying an activity event associated with a sudden and substantial increase in network traffic activity. The classification factors 145 may include a classification weight 175 and/or other information. The classification weight 175 relates to a value that may be used to increase and/or decrease the likelihood that an activity event is a sales event or other type of alternative activity event.

The alternative event characteristics 148 may include information relating to network attacks that may cause an increase in network traffic activity regarding the electronic marketplace and essentially creating a disturbance for the intended users of the electronic marketplace. For example, such a network attack may be a denial of service attack or distributed denial of service attack which may make the electronic marketplace or portions of the electronic marketplace unavailable to its intended users. The sales event characteristics 151 may include information relating to the prior sales events. For example, when a sales event is confirmed, the related factors or combination of the factors may be stored in the sales event characteristics 151 in order to predict other sales events. The order data 154 may include information relating to the order and/or orders of an item and/or items offered for sale, lease, download, and/or other form of consumption within the electronic marketplace.

Network content data 157 may include images, text, code, graphics, audio, video, and/or other content that may be served up by the electronic commerce system 118. To this end, network content data 157 may include static network content or static elements of network content, for example, in hypertext markup language (HTML), extensible markup language (XML), and/or any other language suitable for creating network content. Further network content data 157 may include code that generates dynamic network pages when executed or interpreted in the computing environment 103. Such code may be written in any suitable programming language, such as PHP, Perl, Objective C, Java, Ruby, etc. Network content data 157 may also include code configured to be executed or interpreted within a client 106 in order to render a dynamic network content. Such code may be referred to as applets and may be written in any suitable programming language, such as JavaScript, Java, etc.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 181. The display 181 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client application 178 and/or other applications. The client application 178 may be executed in a client 106, for example, to access network content served up by the computing environment 103 and/or other servers, thereby rendering a user interface 112 on the display 181. In some embodiments, the client application 178 may receive a request from the computing environment 103 for application behavior data 182. The application behavior data 182 may include data from the client 106 that is in response to the request. The use of the application behavior data 182 may be used to determine whether or not the operator of the client 106 is a computer or human. Accordingly, the application behavior data 182 may be used in classifying whether a detected event is a sales event or some other type of event (i.e. network attack event). The client application 178 may, for example, correspond to a browser, a mobile application, etc., and the user interface 112 may correspond to a network page, a mobile application screen, etc. The client 106 may be configured to execute applications beyond the client application 178 such as, for example, email applications, social networking applications, and/or other applications.

Next, a general description of the operation of the various components of the networked environment 100 is provided. An electronic marketplace including listings of items offered for sale by at least one merchant may experience sudden and substantial increases in network traffic activity which may be a result of a sales event or some other type of event, such as, for example, a network attack event. By being able to predict and classify activity events which cause sudden and substantial increases in network traffic activity, network capacity requirements relating to the support of the electronic marketplace may be adjusted so that the intended customers of the electronic marketplace are able to access desired content.

In one embodiment, the event predictor service 121 predicts the future occurrence of a sales event by evaluating event prediction factors 139, either individually or in combination. As previously discussed, the event prediction factors 139 may include: the start time of a promotion; the time related to the release of messages which including a product advertisement and/or other information related to an item (e.g. design change); the time related to when inventory becomes buyable; the time when an item price decreases; the time when a combination of at least a subset of the factors occurs at the same time; a pattern of event prediction factors 139 relating to prior sales events; a social media interest; and/or other factors which may affect the interests of users with respect to items offered for sale in the electronic marketplace.

For example, the event predictor service 121 may scan the promotions database 133 to determine whether there are any promotions that are to occur during a certain time. A detected promotion may include an offering of a product at a discounted price, a promotion of a type of service offered for sale, and/or some other type of promotion related to an item. In another example, the event predictor service 121 may scan a messaging database 136 to determine whether any messages have been sent or are planned to be sent during the predefined period of time which denote an advertisement relating to an item. For example, a message denoting a design change for an item may be released live at a certain time. By scanning the messaging database 136, the event predictor service 121 may be able to determine the time when the messaging of the design change occurs. In addition, the event predictor service 121 may be able to determine the time when the "new" product (e.g. design change) will be available for purchase. As such, the event predictor service 121 may consider the detected times when predicting the future occurrence of a sales event. In another example, the event predictor service 121 may be able to detect an increased interest in a particular item by evaluating social media sites. Accordingly, if evaluation of social media sites show an increased interest in a particular item, the event predictor service 121 may determine that the detected social media interest should be considered in determining the probability of a future sales event.

Each of the event prediction factors 139 may have a corresponding prediction weight 169 which may be used when predicting the future occurrence of a sales event. For example, if the event predictor service 121 identifies an occurrence of an event prediction factor 139 (e.g. promotion, buyable inventory, etc.), an event probability value 172 may be determined based upon a value associated with the event prediction factor 139 and the corresponding prediction weight 169. For example, if the event predictor service 121 identifies the start of a promotion to occur during the predefined period of time, the event probability value 172 may be increased by the prediction weight 169 associated with the event prediction factor 139 (e.g. start times for promotions). Accordingly, the event probability value 172 then would reflect the occurrence of the identified event prediction factor 139 during the predefined period of time resulting in an increase likelihood of a future occurrence of a sales event. If there were multiple identified event prediction factors 139, the event probability value 172 would be the weighted sum of the values associated with each of the event prediction factors 139.

In another example, the value corresponding to the event prediction factor 139 using the corresponding prediction weight 169 may be further based at least in part on other factors such as, for example, the popularity of an item. For example, assume the start of a promotion is identified by the event predictor service 121 during the predefined period of time. If the event predictor service 121 determines that the item associated with the promotion is a popular item as defined by the item data 130 and/or the interaction history 160 associated with the user profile data 127, the likelihood of a future occurrence of a sales event would be greater than if the item was not considered a popular item. As such, the weighted value associated with the event prediction factor 139 and the corresponding prediction weight 169 may be further adjusted to reflect the popularity of the item.

In another example, the event probability value 172 may vary based at least upon a combination of the event prediction factors 139. For example, assume that the event prediction factors 139 that are searched for by the event predictor service 121 are A, B, and C. The event probability value 172 may be one value (e.g. 10) if A and B result in the identification of event prediction factors 139, but C does not. However, the event predictor service 121 may assign and/or increment an event probability value 172 based on another value (e.g. 5) if A and C result in the identification of event prediction factors 139, but B does not. The value assigned to or used to increment the event probability value 172 based on the combination of the event prediction factors 139 may be based on prior sales event characteristics 151. Alternatively the value may be a predefined value that is independent of the prior sales event characteristics 151.

Upon determining the event probability value 172 based on at least one event prediction factor 139, the event predictor service 121 may compare the event probability value 172 with a predefined event threshold value to determine whether the event probability value 172 predicts that a future occurrence of a sales event will occur. For example, if the predefined event threshold value is "10" and the event probability value 172 is "12" following the evaluation of the event prediction factors 139, the event predictor service 121 will predict that a future occurrence of a sales event will likely occur during the predefined period of time. Accordingly, the event predictor service 121 may store at least a notation reflecting the prediction of a sales event to occur during the predefined period of time in the predicted event data 142. The notation may include information relating to a time related to the identified event prediction factor 139, the item, and/or other information associated with the identified event prediction factor 139. This information may be used by the event classification service 124 as a classification factor 145 in classifying an activity event as discussed in further detail below.

In one example, if the event predictor service 121 predicts the future occurrence of a sales event, the event predictor service 121 may recommend that the network requirements of the system supporting the electronic marketplace be adjusted for at least the predefined period of time to support the predicted sales event. Such adjustments may include scaling the network capacity during the predefined period of time to support a probable sudden and significant increase in traffic activity, limiting the amount of network content that may be presented and/or other adjustments that may prepare a system to network disruptions due to a sales event.

In another embodiment, the event classification service 124 may detect a sudden and substantial increase in network traffic activity. To detect a sudden and substantial increase in network traffic activity the event classification service 124 may monitor the system supporting the electronic marketplace. Alternatively the event classification service 124 may receive network traffic information from another service that monitors the network traffic activity. Regardless, upon detecting an increase in network traffic activity, the event classification service 124 may determine if the increase is sudden and substantial.

In determining whether the increase in network traffic activity is sudden and substantial, the event classification service 124 compares the current level of network traffic activity with a predefined normalized value. The value of the increase in traffic activity may be compared with a predefined event detection threshold. This predefined event detection threshold may be used to determine what may be considered "substantial." In another example, the event classification service 124 may determine the amount of time it took for the traffic activity to increase. By comparing the amount of time it took for the increase in traffic with a predefined time threshold, the event classification service 124 may classify the increase as sudden. Either factor may be evaluated individually or in combination to determine if the increase in traffic activity is sudden and substantial, and therefore, to be considered an activity event.

If a detected increase in network traffic activity is determined to be sudden and substantial (i.e. an activity event), the event classification service 124 may classify the detected activity event as a sales event or other type of alternative activity event. To classify the activity event, the event classification service 124 may evaluate at least one classification factor 145 which may include: whether a sales event was previously predicted to occur at the time of the sudden increase in network traffic activity; whether the network traffic from known sale referrers spike; whether a spike in purchase orders occurs at the same time as the sudden increase in network traffic activity, whether characteristics surrounding the current sudden increase in network traffic activity are similar to known characteristics from either prior known sales events or other types of alternative activity events; and/or other factors that may be used to characterize the cause of the sudden increase in network traffic activity.

If an evaluation of a classification factor 145 results in a identification of a positive result (i.e. order spike, predicted sales event, etc.), the event classification service 124 may increment a classification value based at least in part on a classification weight 175 associated with the evaluated classification factor 145. Accordingly, if there are multiple classification factors 145 identified, the classification value is based at least in part upon the weighted sum of values for each of the identified classification factors 145. In another example, the classification value may vary based on the result of the evaluation of each classification factor 145. For example, if the event classification service 124 identifies an order spike and a predicted sales event, the classification value will be greater than if the event predictor service 121 only identifies an order spike.

Upon determining the classification value, the event classification service 124 may compare the classification value with a predefined sales event threshold to determine whether the activity event is a sales event or other type of alternative activity event, such as, for example, a network attack event. For example, assume the predefined sales event value is "5." Further assume that the classification value corresponding to the increase in network traffic activity is "8." The event classification service 124 will classify the activity event related to the sudden and substantial increase in network traffic activity as a sales event since it at least reaches the predefined sales event value. Alternatively, assume that the classification value corresponding to the increase in network traffic activity is "2." In this example, the event classification service 124 may classify the activity event related to the sudden and substantial increase in network traffic activity as some other type of alternative activity event.

Upon classifying the detected network activity as a sales event or other type of alternative activity event, the event classification service 124 may adjust the network requirements and/or recommend adjusting the network requirements based at least in part on the type of activity event. Adjustments that the event classification service 124 may consider depending on the type of activity event may include scaling to add network capacity, not scaling, adjusting router activity, minimizing the amount of network content displayed, preloading a cache with additional content information, denying traffic accessing supported content and/or other factors that can be used to adjust the system to support the increase in network traffic.

Figure 2:
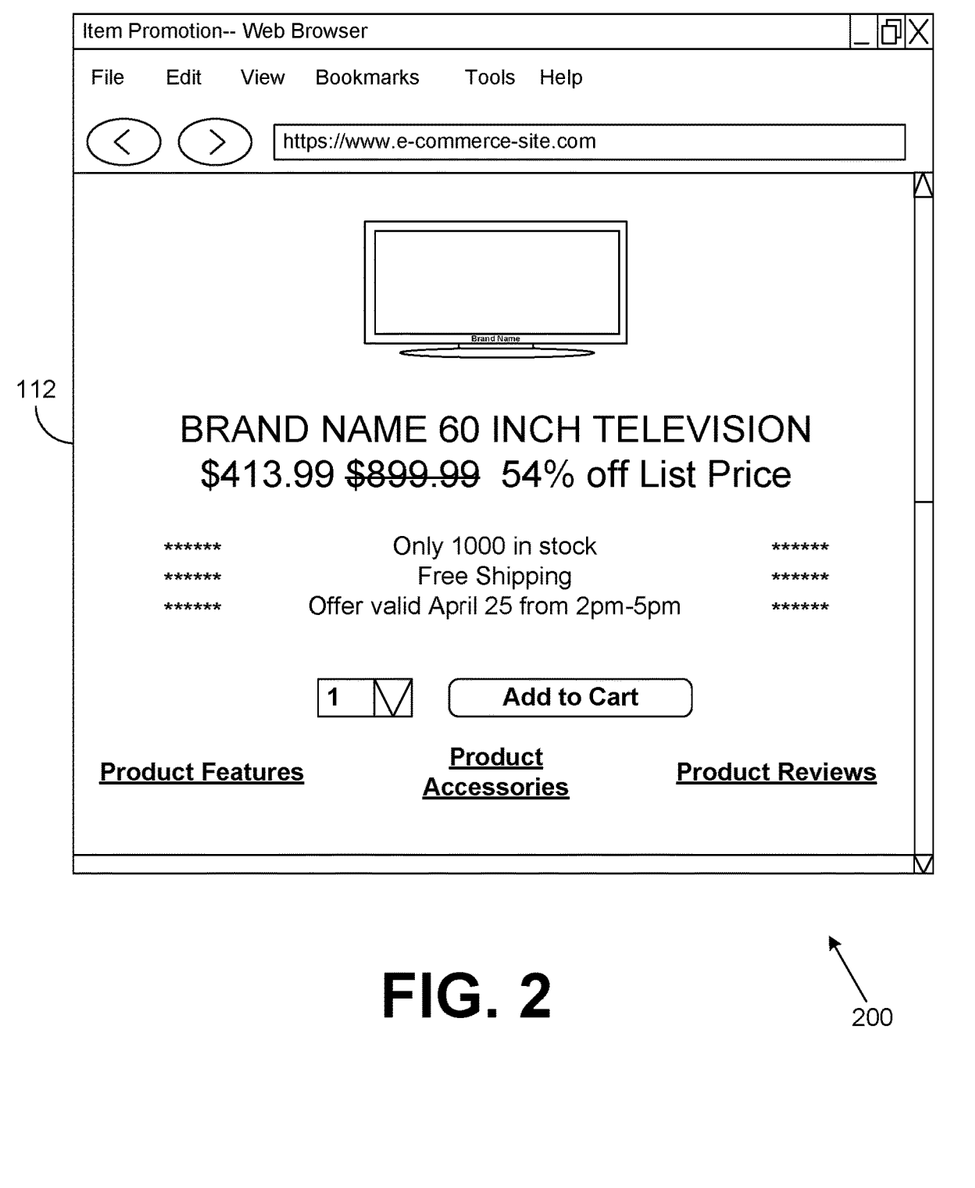
FIG. 2 is a drawing of an example of a user interface rendered by a client in the networked environment of FIG. 1B according to various embodiments of the present disclosure.

Referring next to FIG. 2, shown is one example of a user interface 112 rendered by a client 106 (FIGS. 1A and 1B) in the networked environment 100 (FIGS. 1A and 1B) according to various embodiments of the present disclosure. In particular, FIG. 2 depicts an example of an item sales page 200 rendered by the client application 178. Specifically, the item sales page 200 shows buy-box including an offer relating to the purchase of a television at a discounted price. As noted in the item sales page 200, the offer is valid only for a limited time (i.e., April $25^{th}$ 2 pm-5 pm) and includes limited inventory (i.e. 1000 televisions). The factors that may be searched for to predict whether this offer may result in a sales event include the start time of the item promotion (i.e., April $25^{th}$ at 2 p.m.), the time that content the item sales page 200 became accessible to users, the decrease in the price (i.e., 54% off of list price); the time that the product first became buyable (i.e. old product vs. new product), a social media interest, and/or other factors that may create an interest from multiple users thus having the potential to create a sudden increase in traffic activity. Each of these factors may be evaluated, individually and/or in combination, when predicting whether this offer may constitute a sales event.

Figure 3A:
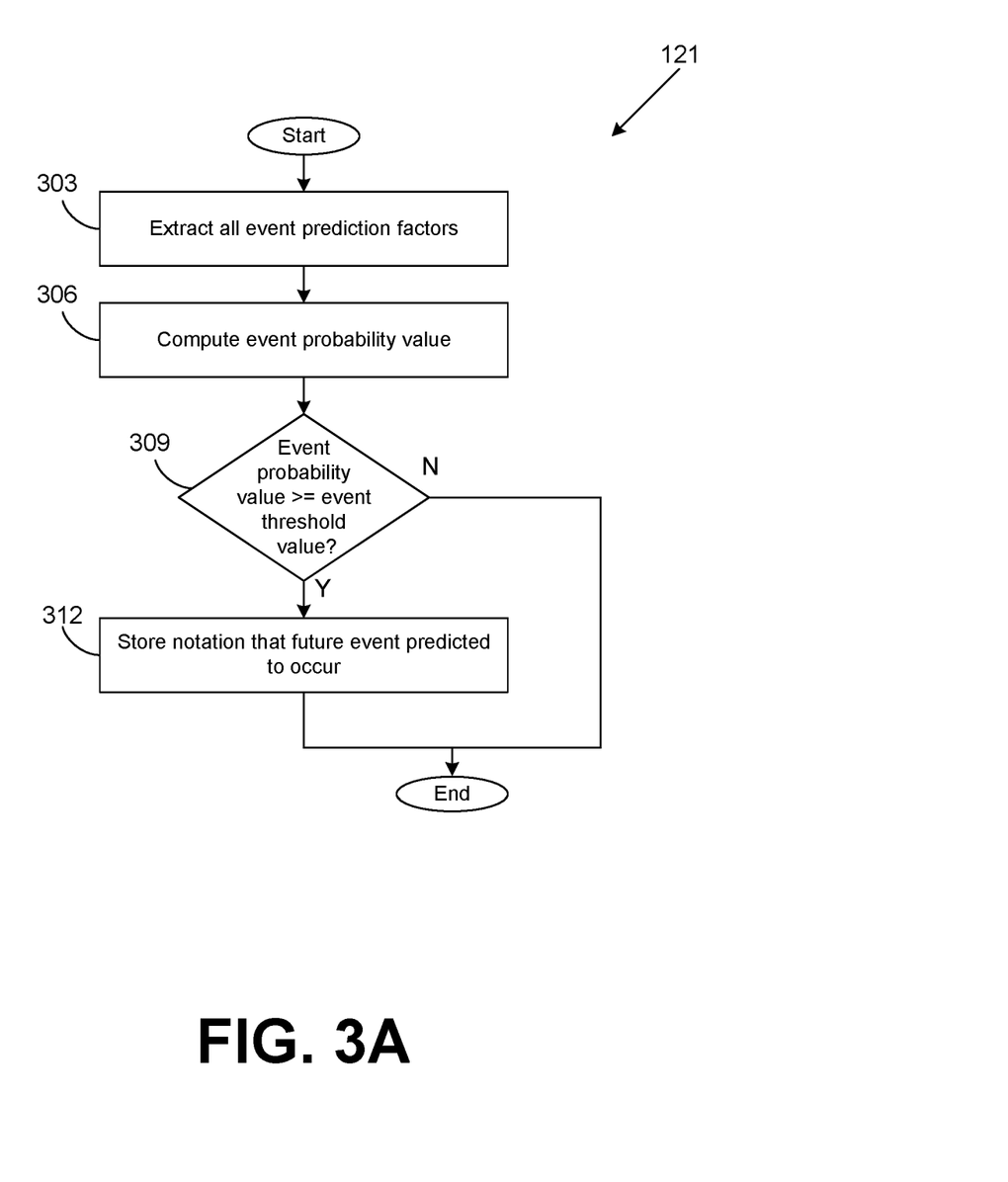
FIGS. 3A-3B are flowcharts illustrating examples of functionality implemented as portions of an event predictor service executed in a computing environment in the networked environment of FIG. 1B according to various embodiments of the present disclosure.

Moving on to FIG. 3A, shown is a flowchart that provides one example of the operation of a portion of the event predictor service 121 according to various embodiments. It is understood that the flowchart of FIG. 3A provides merely an example of the many different types of functional arrangements that may be employed to implement the operation of the portion of the event predictor service 121 as described herein. As an alternative, the flowchart of FIG. 3A may be viewed as depicting an example of steps of a method implemented in the computing environment 103 (FIGS. 1A-1B) according to one or more embodiments.

Specifically, FIG. 3A relates to a general overview of predicting the future occurrence of a sales event during a predefined period of time. The event predictor service 121 extracts all event prediction factors, determines the probability of a future sales event, and stores a prediction of the sales event.

In box 303, the event predictor service 121 extracts all of the event prediction factors that are detected to occur. As previously discussed, the event prediction factors 139 may include, but are not limited to, the start time of a promotion; the time related to the release of messages including a product advertisement; the time related to when inventory becomes buyable; the time that an item price decreases; the time when a combination of at least a subset of the factors occurs at the same time, a pattern of event prediction factors 139 relating to prior sales events, a social media interest, and/or other factors which may affect the interests of users with respect to items offered for sale in the electronic marketplace.

By extracting all of the event prediction factors 139 that are detected to occur during a predefined period of time, the event predictor service 121 may be able to determine the likelihood of a sales event occurring during the predetermined period of time. For example, the event predictor service 121 may detect that a promotion, an increase in inventory and a price change related to the same and/or multiple items may all occur during the same period of time. This may be determined by scanning the appropriate database, evaluating notifications of such factors, etc. Accordingly, the event predictor service 121 will have extracted all three event prediction factors 139.

In box 306, the event predictor service 121 may compute an event probability value 172. The event probability value 172 may be computed using a variety of approaches. For example, the event probability value 172 may be computed using a decision tree, a Bayes classifier, a weighted sum (described in more detail with reference to FIG. 3B), and/or any other type of prediction approach. Regardless of the type of prediction approach used to determine the event probability value 172, the event predictor service 121 determines an event probability value 172 that reflects the probability of a future sales event using the extracted predictor factors.

In box 309, the event predictor service 121 compares the event probability value 172 with a predefined event threshold value to determine whether the event probability value 172 at least reaches the event threshold value. The event threshold value is a predetermined value that reflects the likelihood of a sales event. The event threshold value may be a value that is determined from a learned prediction model that reflects prior predictions and accuracy of the predictions. Regardless, if the event probability value 172 reaches or exceeds the event threshold value, than the event predictor service 121 predicts that a sales event will occur during the predefined period of time. If the event probability value 172 reaches the event threshold value, the event predictor service 121 proceeds to box 312. Otherwise, the event predictor service 121 ends.

In box 312, the event predictor service 121 stores a notation relating to a prediction of the future sales event in the predicted event data 142. The notation may include information relating to the future sales event such as, for example, the related item, time of predicted sales event, and/or other information that may be used in the future when verifying that a type of activity event is in fact the predicted sales event. In some embodiments, the event predictor service 121 may adjust network capacity requirements in preparation of the event.

Figure 3B:
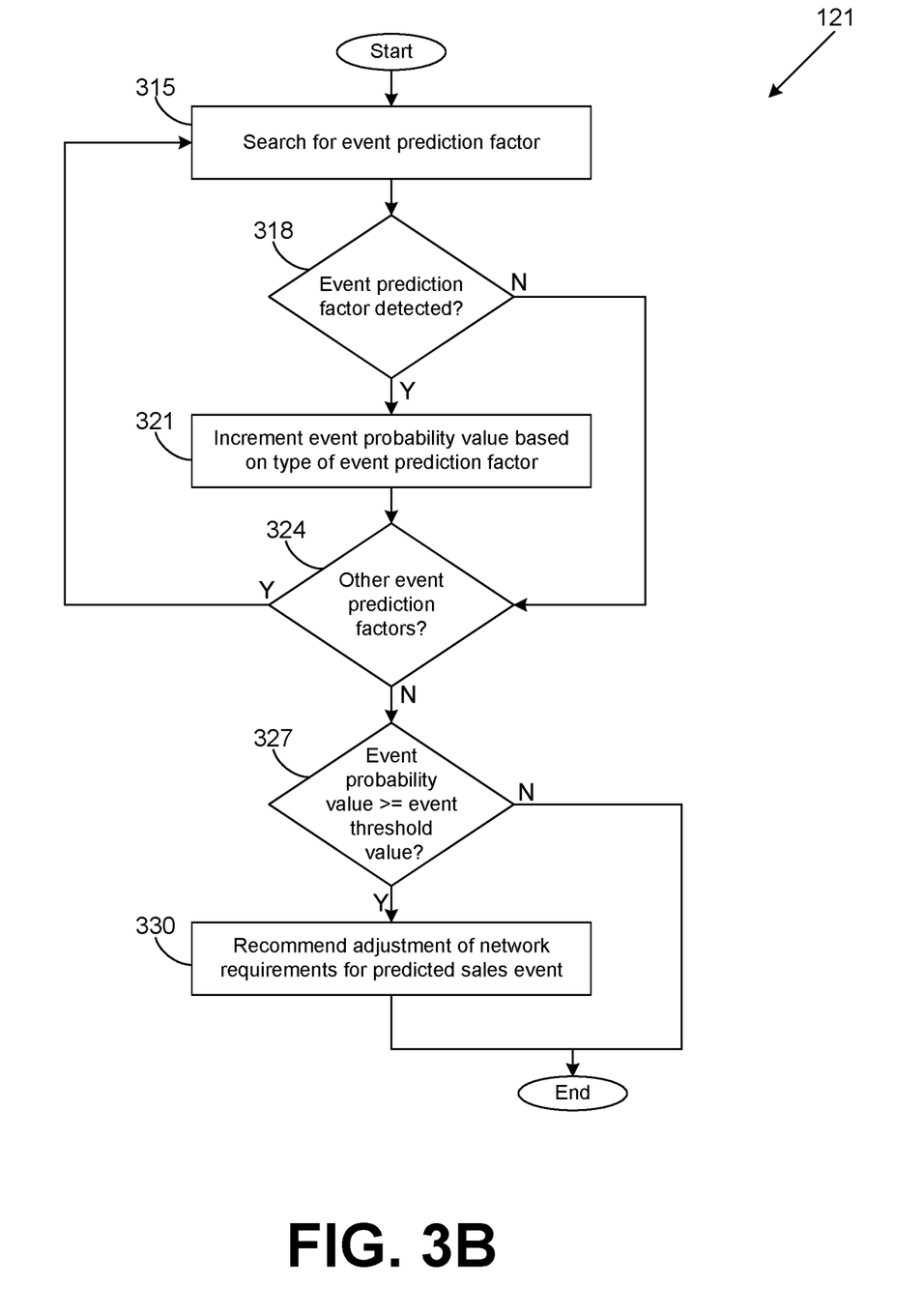

Turning now to FIG. 3B, shown is a flowchart that provides one example of the operation of a portion of the event predictor service 121 according to various embodiments. It is understood that the flowchart of FIG. 3B provides merely an example of the many different types of functional arrangements that may be employed to implement the operation of the portion of the event predictor service 121 as described herein. As an alternative, the flowchart of FIG. 3B may be viewed as depicting an example of steps of a method implemented in the computing environment 103 (FIGS. 1A-1B) according to one or more embodiments.

Specifically, FIG. 3B relates to predicting the future occurrence of a sales event during a predefined period of time. The event predictor service 121 may search for one or more event prediction factors 139 to identify whether an event prediction factor 139 is scheduled to occur within a predefined period of time. Based on the results of the search for an event prediction factor 139, individually and/or a combination of at least two searched for event prediction factors 139, an event probability value 172 based on a weighted sum may be determined. Accordingly, the event probability value 172 may be used in determining the likelihood of an occurrence of a sales event during a predefined period of time.

Beginning with box 315, the event predictor service 121 searches for the occurrence of an event prediction factor 139 during a predefined period of time. As previously discussed, the event prediction factors 139 may include the start time of an item promotion; the time related to the release of messages including a product advertisement; the time related to when inventory becomes buyable; the time that an item price decreases; a time when a combination of at least a subset of the factors occurs at the same time, a pattern of event prediction factors 139 relating to prior sales events, a social media interest, and/or other factors which may affect the interests of users with respect to items offered for sale in the electronic marketplace.

In one example, assume that the event predictor service 121 searches for an event prediction factor 139 relating to promotions. To determine the start time of a promotion, the event predictor service 121 may scan the promotions database 133 to determine whether any promotions are scheduled to start during a predefined period of time (e.g. within the hour, within the next week, a particular date, etc.). By scanning the promotions database 133, the event predictor service 121 may search for a promotion scheduled to occur during the predefined period of time.

In another example, the event predictor service 121 may scan the item data 130 and item availability data 163 to determine whether an item is scheduled to become buyable during the predefined period of time. Accordingly, the event predictor service 121 may search for an item that is about to become available for purchase which may affect the interest in the item. Upon searching for an event prediction factor 139, the event predictor service 121 proceeds to box 318.

In box 318, the event predictor service 121 determines whether an event prediction factor 139 has been identified to occur within the predetermined time period. For example, an event prediction factor 139 related to a promotion may be identified by the event predictor service 121 during a search of the promotions database 133 determines that the start of the promotion is scheduled to occur when scanning the promotions database 133. For example, assume that the predefined period of time relates to anytime on May $10^{th}$. Additionally, assume that a promotion relating to a video game console is identified to occur at 2 p.m. on May $10^{th}$. A search of the promotions database 133 will identify the start of this item promotion related to the video game console. In another example, if the event prediction factor 139 relates to messaging notifications relating to products, an event prediction factor 139 will be identified if the event predictor service 121 scans the messaging database 136 and identifies that messaging relating to a design change for a particular product goes live during the predefined period of time. If an event prediction factor 139 is identified, the event predictor service 121 proceeds to box 321. Otherwise, the event predictor service 121 proceeds to box 324.

In box 321, the event predictor service 121 increments the event probability value 172 that is associated with the predefined period of time by a value based at least upon a predefined prediction weight 169 associated with the event prediction factor 139. Accordingly, the event probability value 172 may be the weighted sum of values associated with each event prediction factor 139 and corresponding predefined prediction weight 169. For example, when the search for an event prediction factor 139 results in the identification of an event prediction factor 139, the likelihood of a sales event occurring during the predefined period of time increases. As such, the event probability value 172 will be incremented to reflect the likelihood of a sales event occurring during the predefined period of time.

In one example, the value associated with a particular event prediction factor 139 and predefined prediction weight 169 may be based on other factors as well. For example, assume that the event prediction factor 139 relates to item promotions. As such, if the start of an item promotion is identified to occur during the predefined period of time, the event predictor service 121 may additionally determine the popularity of the item that relates to the item promotion. As such, the value associated with the item promotion may be further calculated based on the popularity of the item. For example, the item data 130 may reflect a known popularity of a particular item. Accordingly, if the item relating to the item promotion is determined to be a popular item, the value corresponding to the event prediction factor 139 for item promotions may be increased to reflect the popularity. Alternatively, there may already be established a prediction weight 169 for popular items and a prediction weight 169 for all other items. Regardless, once the event probability value 172 is incremented by a value calculated based on at least the prediction weight 169, the event predictor service 121 proceeds to box 324.

In box 324, the event predictor service 121 determines whether to search for additional event prediction factors 139. For example, if the event predictor service 121 has only searched for one of three event prediction factors 139 to occur during predefined period of time, it will be determined that there are other event prediction factors 139 to search for an occurrence of during the predefined period of time. Accordingly, if it is determined that there are other event prediction factors 139 to search for, the event predictor service 121 proceeds to box 315. Otherwise, the event predictor service 121 proceeds to box 327.

In box 327, the event predictor service 121 determines whether the event probability value 172 at least reaches the event threshold value. The event threshold value is a predetermined value that reflects the likelihood of a sales event. The event threshold value may be a value that is determined from a learned prediction model that reflects prior predictions and accuracy of the predictions. Regardless, if the event probability value 172 reaches or exceeds the event threshold value, than the event predictor service 121 predicts that a sales event will occur during the predefined period of time. Accordingly, the information relating to the prediction of the sales event may be stored in the predicted event data 142. If the event probability value 172 reaches the event threshold value, the event predictor service 121 proceeds to box 330. Otherwise, the event predictor service 121 ends.

In box 330, the event predictor service 121 recommends adjusting the network requirements of the system supporting the electronic marketplace due to the predicted sales event. For example, the event predictor service 121 may recommend scaling the network capacity during the predefined period of time to support a probable sudden and significant increase in traffic activity. Alternatively or in addition, the event predictor service 121 may recommend limiting the amount of network content that may be presented. For example, the event predictor service 121 may recommend that the images are not to be included with any network content that is related to the predicted sales event. It should be noted, that while only a few examples of adjusting the network requirements have been discussed herein, there may be other approaches to adjusting the network requirements in preparation of a predicted sales event. Upon recommending adjusting the network requirements, the event predictor service 121 ends.

Figure 4:
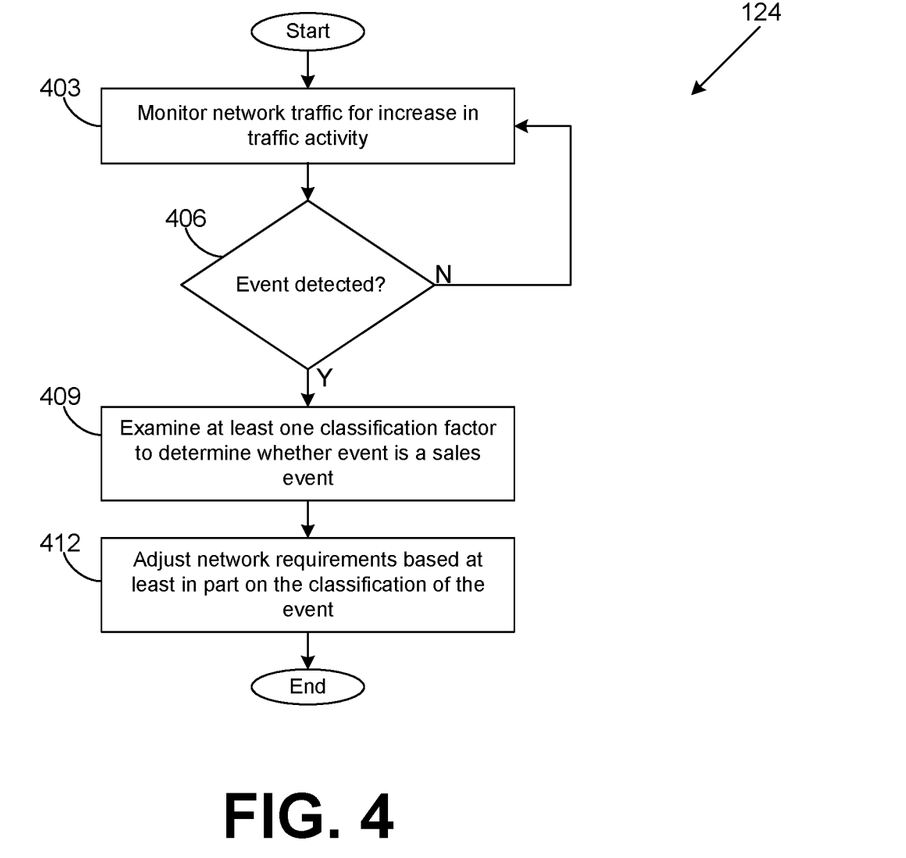
FIG. 4 is a flowchart illustrating one example of functionality implemented as portions of an event classification service executed in a computing environment in the networked environment of FIG. 1B according to various embodiments of the present disclosure.

Moving on to FIG. 4, shown is a flowchart that provides one example of the operation of a portion of the event classification service 124 according to various embodiments. It is understood that the flowchart of FIG. 4 provides merely an example of the many different types of functional arrangements that may be employed to implement the operation of the portion of the event classification service 124 as described herein. As an alternative, the flowchart of FIG. 4 may be viewed as depicting an example of steps of a method implemented in the computing environment 103 (FIGS. 1A-1B) according to one or more embodiments.

Specifically, FIG. 4 relates to classifying whether a detected sudden and substantial increase in traffic activity is related to a sales event or another type of alternative activity event. Upon detection of a sudden increase in traffic activity, the event classification service 124 may evaluate one or more factors, individually or in combination, to determine whether the detected sudden and substantial increase in network traffic activity is related to a sales event or another type of alternative activity event. Accordingly, network requirements may be adjusted based at least in part on the classification of the type of event.

Beginning with box 403, the event classification service 124 monitors the network traffic relating to the electronic marketplace to detect any type of increase in traffic activity. The increase of traffic activity may be relative to a predefined normalized value. When the event classification service 124 identifies an increase in the network traffic activity, the event classification service 124 proceeds to box 406.

In box 406, the event classification service 124 determines whether an activity event is related to the detected increase in traffic activity with respect to the electronic marketplace. This detected increase in traffic activity may be related to the entire electronic marketplace or portions of content accessible via the network 109. While fluctuations in network traffic may be common, the increase in traffic activity may be detected to be a sudden and substantial increase, reflecting a type of activity event. This activity event may be a sales event or some other type of alternative activity event.

In one example, the increase in traffic activity may be determined by comparing the current level of network traffic activity with a predefined normalized value. The value of the increase in traffic activity may be compared with a predefined event detection threshold. This predefined event detection threshold may be used to determine what may be considered "substantial." In another example, the event classification service 124 may determine the amount of time it took for the traffic activity to increase. By comparing the amount of time it took for the increase in traffic with a predefined time threshold, the event classification service 124 may classify the increase as sudden. Either factor may be evaluated individually or in combination to determine if the increase in traffic activity is sudden and substantial, and therefore, to be considered an activity event. If the increase in traffic activity is determined to be an activity event, the event classification service 124 proceeds to box 409. Otherwise, the event classification service 124 proceeds to box 403.

In box 409, the event classification service 124 examines at least one classification factor 145 to determine whether the event is a sales event. The classification factors 145 may include: whether the event predictor service 121 predicted a sales event to occur at the same time; whether the increase of network traffic activity relates to an increase in network traffic from known sales referrers; whether the order data 154 reflects a significant increase in orders for an item and/or items at the time of the increase in traffic activity; whether a predefined number of users assessing the content relating to the traffic activity have an interest in an item associated with the content based at least in part on his or her corresponding interaction history 160; a comparison of characteristics relating to the current increase in network traffic activity with the alternative event characteristics 148; a comparison of the characteristics relating to the current increase in network traffic activity with the sales event characteristics 151; and/or other factors that may be used in classifying the cause of a sudden and substantial increase in network traffic activity.

In one example, the event classification service 124 may evaluate at least one classification factor 145. Based on the result of the evaluation, the event classification service 124 may adjust a classification value that is associated with the detected increase of network traffic activity. For example, assume that following the detection of an activity event based on a sudden and substantial increase in network traffic activity, the event classification service 124 evaluates the classification factors 145 relating to predicted sales events and order spikes. Further assume that following an evaluation of the predicted event data 142, the event classification service 124 determines that a sales event was predicted to occur during the time of the current detected activity event. As such, the event classification service 124 may increase the corresponding classification value by a classification weight 175 associated with predicted sales event (e.g. "5"). In addition, further assume that the following an evaluation of the order data 154, the event classification service 124 identifies a substantial increase in orders. This may be determined by comparing the current incoming orders for an item and/or items with a predefined average order value. A spike in orders may be based at least in part on the difference between the current income orders and the predefined average order value. Following the identification of an order spike, the event classification service 124 may increase the classification value by a classification weight 175 associated with an identified order spike (e.g. "3").

Following the evaluation of classification factors 145, the event classification service 124 may compare the classification value with a predefined sales event value. The predefined sales event value may provide a threshold in determining whether the activity event is a sales event or other type of alternative activity event. For example, assume the predefined sales event value is "5." Further assume that the classification value corresponding to the increase in network traffic activity is "8." The event classification service 124 will classify the activity event related to the sudden and substantial increase in network traffic activity as a sales event since it at least reaches the predefined sales event value. Alternatively, assume that the classification value corresponding to the increase in network traffic activity is "2." In this example, the event classification service 124 may classify the activity event related to the sudden and substantial increase in network traffic activity as some other type of alternative activity event.

In another example, the event classification service 124 may classify the activity event relating to the increase in network activity based at least in part on a combination of the factors. For example, assume that the event classification service 124 evaluates three of the following classification factors 145: A, B, and C. Assume A, B, and C relate to at least one of the classification factors 145 previously defined. In addition, assume that an evaluation of A and C identifies a positive result (e.g. identification of an order spike). However, an evaluation of classification B identifies a negative result (e.g. no predicted sales event). However, the event classification service 124, based on sales event characteristics 151, alternative event characteristics 148 and/or some other learned model may state that if A and C occur, but not B than the activity event is a sales event. However, if A and B occur and not C, than event classification service 124 may classify the activity event as another type of alternative activity event. Accordingly, the combination of results may be used to classify whether the activity event is a sales event or other type of alternative activity event.

In box 412, the event classification service 124 adjusts the network requirements relating to the electronic marketplaces based at least in part on the classification of the activity event. Adjustments that the event classification service 124 may consider depending on the type of activity event may include scaling to add network capacity, not scaling, adjusting router activity, minimizing the amount of network content displayed, preloading a cache with additional content information, denying traffic accessing supported content and/or other factors that can be used to adjust the system to support the increase in network traffic. For example, if the activity event detected from the increase in network traffic activity is classified as a sales event, the event classification service 124 may adjust the network requirements by scaling the system supporting the electronic marketplace to support the increase of traffic activity. However, if the event classification service 124 determines that the increase in network traffic activity is due to some other type of alternative activity event, the event classification service 124 may deny traffic from accessing the supported content and/or not make any network adjustments. Upon adjusting the network requirements based at least in part on the classification of the activity event relating to the increase in network traffic activity, the event classification service 124 ends.

Figure 5:
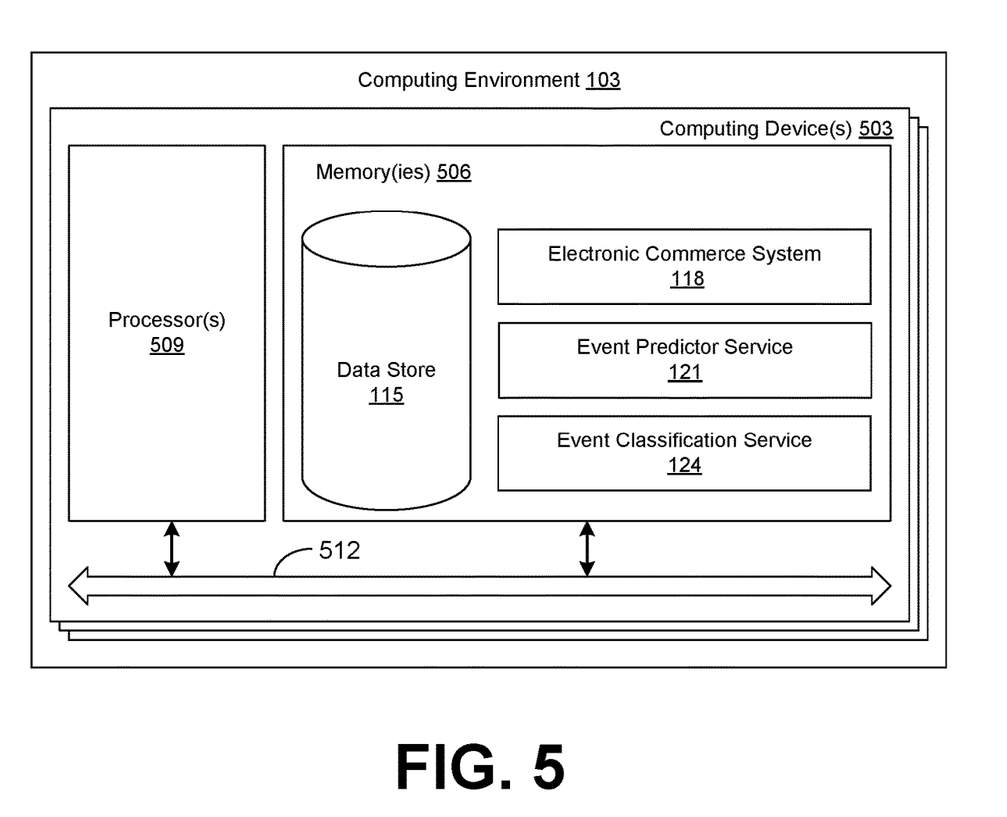
FIG. 5 is a schematic block diagram that provides one example illustration of a computing environment employed in the networked environment of FIGS. 1A and 1B according to various embodiments of the present disclosure.

With reference to FIG. 5, shown is a schematic block diagram of the computing environment 103 according to an embodiment of the present disclosure. The computing environment 103 includes one or more computing devices 503. Each computing device 503 includes at least one processor circuit, for example, having a processor 509 and a memory 506, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 506 are both data and several components that are executable by the processor 509. In particular, stored in the memory 506 and executable by the processor 509 are an electronic commerce system 118, an event predictor service 121, an event classification service 124, and potentially other applications. Also stored in the memory 506 may be a data store 115 and other data. In addition, an operating system may be stored in the memory 506 and executable by the processor 509.

It is understood that there may be other applications that are stored in the memory 506 and are executable by the processor 509 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 509. In this respect, the term "executable" means a program file that is in a form that can ultimately be run by the processor 509. Examples of executable programs may be, for example, a compiled program that can be translated into machine code in a format that can be loaded into a random access portion of the memory 506 and run by the processor 509, source code that may be expressed in proper format such as object code that is capable of being loaded into a random access portion of the memory 506 and executed by the processor 509, or source code that may be interpreted by another executable program to generate instructions in a random access portion of the memory 506 to be executed by the processor 509, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 509 may represent multiple processors 509 and/or multiple processor cores and the memory 506 may represent multiple memories 506 that operate in parallel processing circuits, respectively. In such a case, the local interface 512 may be an appropriate network that facilitates communication between any two of the multiple processors 509, between any processor 509 and any of the memories 506, or between any two of the memories 506, etc. The local interface 512 may comprise additional systems designed to coordinate this communication, including, for example, performing load balancing. The processor 509 may be of electrical or of some other available construction.

Although the electronic commerce system 118, the event predictor service 121, the event classification service 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A, 3B, and 4 show the functionality and operation of an implementation of portions of the event predictor service 121 and the event classification service 124, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 509 in a computer system or other system. The machine code may be converted from the source code, etc. If embodied in hardware, each block may represent a circuit or a number of interconnected circuits to implement the specified logical function(s).

Although the flowcharts of FIGS. 3A, 3B, and 4 show a specific order of execution, it is understood that the order of execution may differ from that which is depicted. For example, the order of execution of two or more blocks may be scrambled relative to the order shown. Also, two or more blocks shown in succession in FIGS. 3A, 3B, and 4 may be executed concurrently or with partial concurrence. Further, in some embodiments, one or more of the blocks shown in FIGS. 3A, 3B, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 118, the event predictor service 121, and the event classification service 124, that comprises software or code can be embodied in any non-transitory computer-readable medium for use by or in connection with an instruction execution system such as, for example, a processor 509 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   at least one application executable in the at least one computing device, wherein, when executed, the at least one application causes the at least one computing device to at least:
   monitor network activity associated with an electronic commerce system;
   detect an increase in the network activity;
   classify the increase in the network activity based at least in part on an evaluation of one or more classification factors, wherein a positive identification of the one or more classification factors results in an incrementation of a classification value based at least in part on a classification weight associated with the positive identification;
   determine that the increase in the network activity is unrelated to one or more previously predicted activity events, the determination occurring based at least in part on a comparison of the classification value to a predefined activity event threshold corresponding to the one or more previously predicted activity events; and
   adjust the electronic commerce system to reduce the network activity in response to determining that the increase in network activity is unrelated, the electronic commerce system being adjusted by adjusting one or more network requirements associated with the electronic commerce system, the one or more network requirements comprising at least one of a network capacity, a router activity, or a cache load.

2. The system of claim 1, wherein, when executed, the at least one application further causes the at least one computing device to at least predict that a particular activity event will occur during a future period of time based at least in part on an event probability value reflecting a probability that the particular activity event will occur during the future period of time.

3. The system of claim 2, wherein, when executed, the at least one application further causes the at least one computing device to at least determine the event probability value according to at least one of a sales promotion, a change in an item price, an item messaging event, an availability of item inventory, a social media interest, or an increase in the item inventory.

4. The system of claim 2, wherein, when executed, the at least one application further causes the at least one computing device to at least determine a level of popularity associated with an item of the particular activity event, the event probability value being based at least in part on the level of popularity.

5. The system of claim 1, wherein, when executed, the at least one application further causes the at least one computing device to at least deny network traffic accessing the electronic commerce system in response to determining that the increase of the network activity is unrelated.

6. The system of claim 1, wherein, when executed, the at least one application further causes the at least one computing device to at least identify the one or more previously predicted activity events in response to scanning at least one of a promotions database or a messaging database.

7. The system of claim 1, wherein the one or more classification factors comprises whether order data reflects a significant increase in orders for one or more items during a time period associated with the increase in the network activity, a comparison of characteristics relating to the increase in the network activity with alternative event characteristics, or whether a sales event was previously predicted to occur during a time period associated with the increase in the network activity.

8. A method, comprising:
predicting, via at least one of one or more computing devices, that an occurrence of an event will occur during a future time period;
detecting, via at least one of the one or more computing devices, an increase of network activity of an electronic commerce system;
classifying, via at least one of the one or more computing devices, the increase of the network activity based at least in part on an evaluation of one or more classification factors, wherein a positive identification of the one or more classification factors results in an incrementation of a classification value based at least in part on a classification weight associated with the positive identification;
determining that the increase of network activity is unrelated to the event, the determination occurring based at least in part on a comparison of the classification value to a predefined activity event threshold corresponding to the event; and
in response to determining that the increase of network activity is unrelated to the event, adjusting, via at least one of the one or more computing devices, the electronic commerce system to restrict an amount of network activity during the future time period by adjusting one or more network requirements associated with the electronic commerce system, the one or more network requirements comprising at least one of a network capacity, a router activity, or a cache load.

9. The method of claim 8, further comprising generating, via at least one of the one or more computing devices, a score corresponding to a likelihood of future occurrence of the event, the score being based at least in part on a plurality of event prediction factors.

10. The method of claim 9, wherein the plurality of event prediction factors comprise at least one of a sales promotion, a change in an item price, an item messaging event, an availability of item inventory, a social media interest, or an increase in the item inventory.

11. The method of claim 9, further comprising assigning, via at least one of the one or more computing devices, a respective weight to individual event prediction factors of the plurality of event prediction factors relative to an analysis of the event, the score being a sum of the respective weight for the individual event prediction factors.

12. The method of claim 8, further comprising determining, via at least one of the one or more computing devices, a type of network activity based at least in part on a likelihood of the event occurring during the future time period, an increase of current order sales, a predefined number of interested users accessing the electronic commerce system, or whether the increase of network activity is associated with at least one sale referrer.

13. The method of claim 8, further comprising denying, via at least one of the one or more computing devices, network traffic accessing the electronic commerce system in response to determining that the increase of network activity is unrelated to the event.

14. The method of claim 8, further comprising reducing, via at least one of the one or more computing devices, an amount of network content being provided via the electronic commerce system in response to determining that the increase of network activity is unrelated to the event.

15. A non-transitory computer-readable medium embodying a program executable in at least one computing device, wherein, when executed, the program causes the at least one computing device to at least:
detect an increase in an amount of network activity of an electronic commerce system;
classify the increase in the network activity based at least in part on an evaluation of one or more classification factors, wherein a positive identification of the one or more classification factors results in an incrementation of a classification value based at least in part on a classification weight associated with the positive identification;
determine a type of network activity based at least in part on a comparison of the classification value to a predefined activity event threshold corresponding to one or more previously predicted activity events; and
adjust the electronic commerce system according to the type of network activity, the electronic commerce system being adjusted by adjusting one or more network requirements associated with the electronic commerce system, the one or more network requirements comprising at least one of a network capacity, a router activity, or a cache load.

16. The non-transitory computer-readable medium of claim 15, wherein the electronic commerce system is adjusted to reduce the amount of network activity.

17. The non-transitory computer-readable medium of claim 15, wherein the electronic commerce system is adjusted to support the amount of network activity.

18. The non-transitory computer-readable medium of claim 15, wherein the one or more classification factors comprises at least one of: whether an activity event was previously predicted to occur during a time period associated with the increase in the amount of network activity, whether network traffic from a known sales referrer increased, or whether one or more characteristics of the network activity are similar to one or more characteristics of a prior event.

19. The non-transitory computer-readable medium of claim 18, wherein at least one of the one or more classification factors further comprises whether an amount of time elapsed to increase the network activity is with a predefined time threshold.

20. The non-transitory computer-readable medium of claim 18, wherein at least one of the one or more classification factors further comprises whether the amount of network activity is within a predefined substantial activity threshold.

* * * * *